United States Patent
He et al.

(10) Patent No.: US 8,304,030 B2
(45) Date of Patent: Nov. 6, 2012

(54) METHOD FOR PRODUCING SUBSTRATE HAVING CATALYST COMPOSITIONS ON SURFACES OF OPPOSITE SIDES

(75) Inventors: Ting He, Dublin, OH (US); Eisuke Kimura, Dublin, OH (US); Tadashi Nomura, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 502 days.

(21) Appl. No.: 11/869,213

(22) Filed: Oct. 9, 2007

(65) Prior Publication Data

US 2008/0075877 A1 Mar. 27, 2008

Related U.S. Application Data

(62) Division of application No. 09/957,209, filed on Sep. 20, 2001, now Pat. No. 7,326,669.

(51) Int. Cl.
| | |
|---|---|
| C23C 4/06 | (2006.01) |
| C23C 4/10 | (2006.01) |
| C23C 14/02 | (2006.01) |
| C23C 14/16 | (2006.01) |
| C23C 14/22 | (2006.01) |
| C23C 14/34 | (2006.01) |
| B01J 23/00 | (2006.01) |
| B01J 23/38 | (2006.01) |
| B01J 23/40 | (2006.01) |
| B01J 21/00 | (2006.01) |

(52) U.S. Cl. ........ 427/450; 427/446; 427/453; 427/455; 427/534; 427/576; 427/570; 427/585; 427/250; 204/192.1; 204/192.15; 502/325; 502/326; 502/330; 502/344; 502/300; 502/201; 502/174

(58) Field of Classification Search .................. 427/450
See application file for complete search history.

(56) References Cited

U.S. PATENT DOCUMENTS

| | | | | | |
|---|---|---|---|---|---|
| 3,617,358 | A | * | 11/1971 | Dittrich | 427/447 |
| 3,857,680 | A | * | 12/1974 | Porta et al. | 422/200 |
| 4,457,822 | A | * | 7/1984 | Asano et al. | 204/252 |
| 4,465,580 | A | * | 8/1984 | Kasuya | 204/290.12 |
| 5,559,065 | A | * | 9/1996 | Lauth et al. | 502/5 |
| 5,653,855 | A | * | 8/1997 | Scherer et al. | 204/192.12 |
| 5,881,645 | A | * | 3/1999 | Lenney et al. | 101/463.1 |
| 6,680,044 | B1 | * | 1/2004 | Tonkovich et al. | 423/652 |
| 7,005,404 | B2 | * | 2/2006 | He | 502/325 |
| 2002/0004449 | A1 | * | 1/2002 | Hums | 502/245 |

FOREIGN PATENT DOCUMENTS

DE 198 60 495 A1 * 7/2000

* cited by examiner

*Primary Examiner* — Katherine A Bareford
(74) *Attorney, Agent, or Firm* — Porter Wright Morris & Arthur; Mark Duell

(57) ABSTRACT

A bi-laterally surfaced substrate in which the first surface consists of one or more than one of cerium oxide, aluminum oxide, tin oxide manganese oxide, copper oxide, cobalt oxide, nickel oxide, praseodymium oxide, terbium oxide, ruthenium, rhodium, palladium, silver, iridium, platinum and gold and the second surface consists of one or more than one of ruthenium, rhodium, palladium, silver, iridium, platinum and gold and micro channel micro component reactors including such substrates in a predetermined formed shape and methods for making the same utilizing a thermal spray on one side and a physical deposition process on the other side.

12 Claims, 8 Drawing Sheets

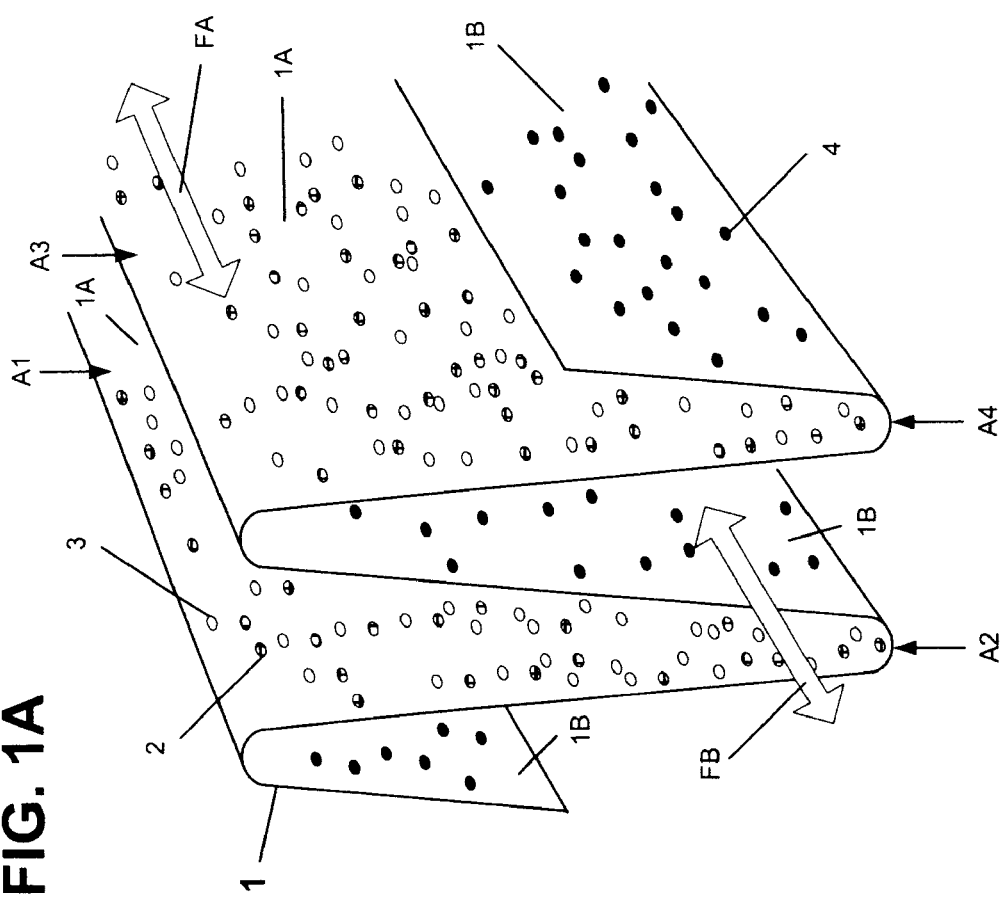
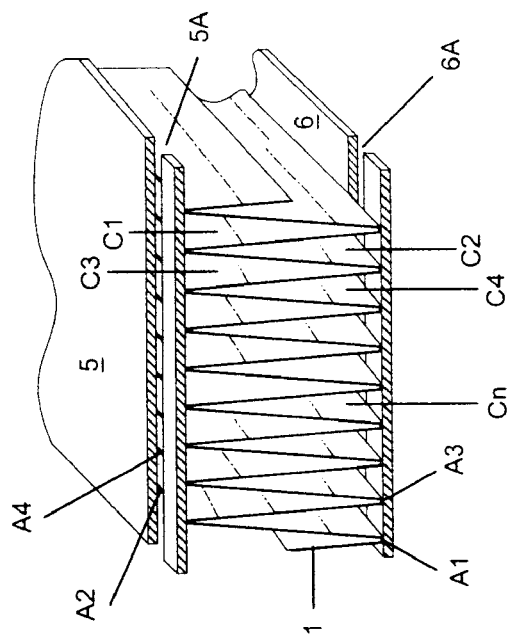
FIG. 1A
FIG. 1B

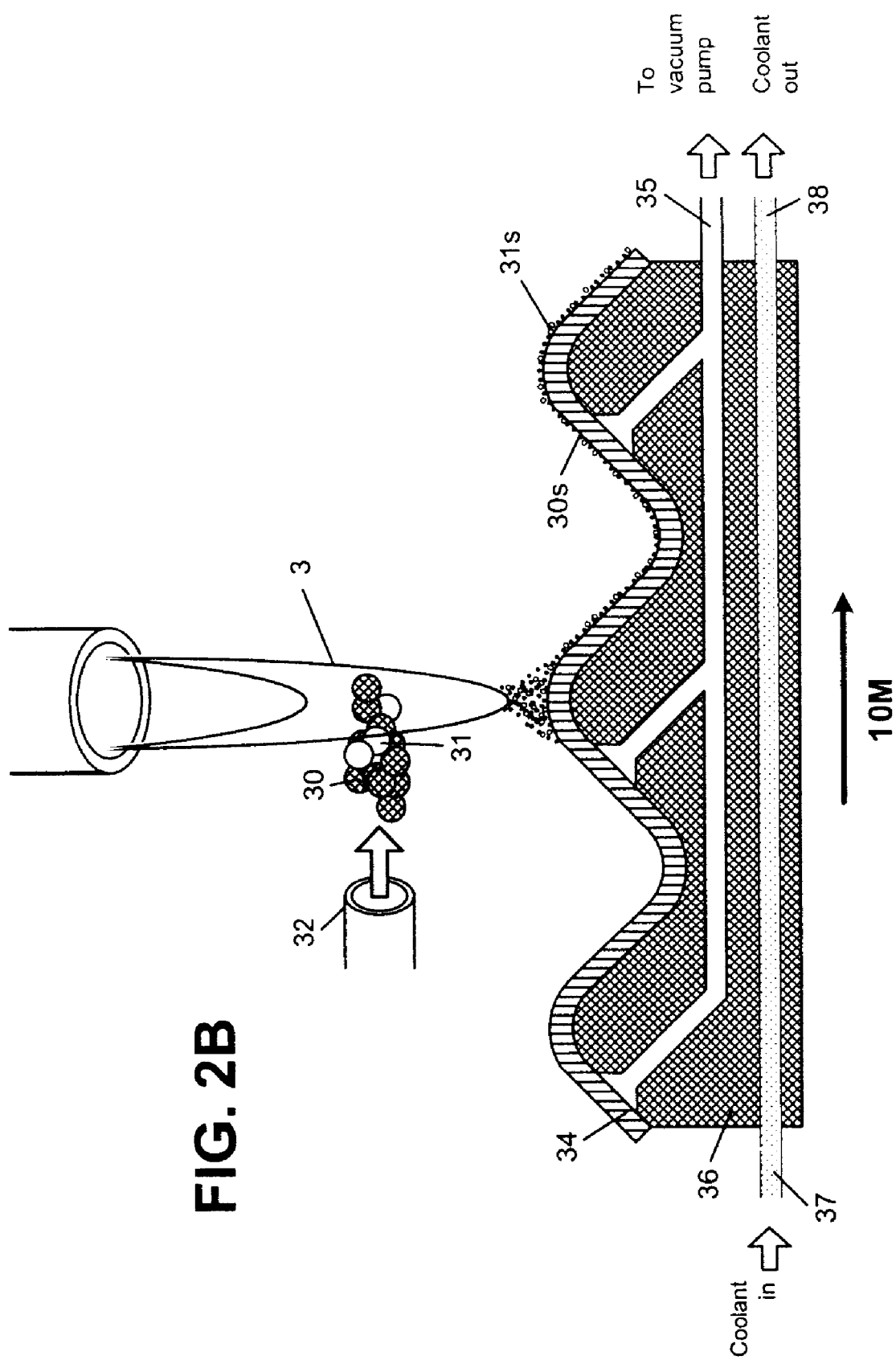

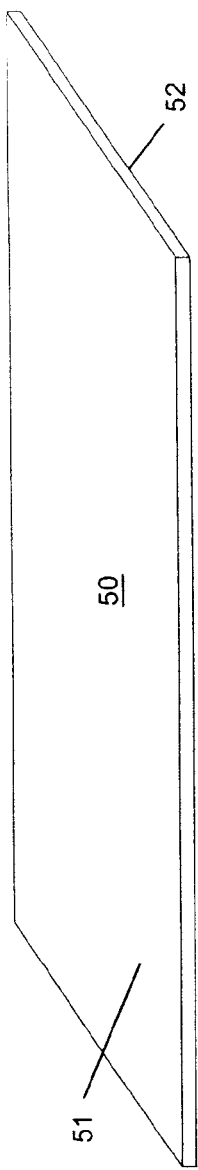
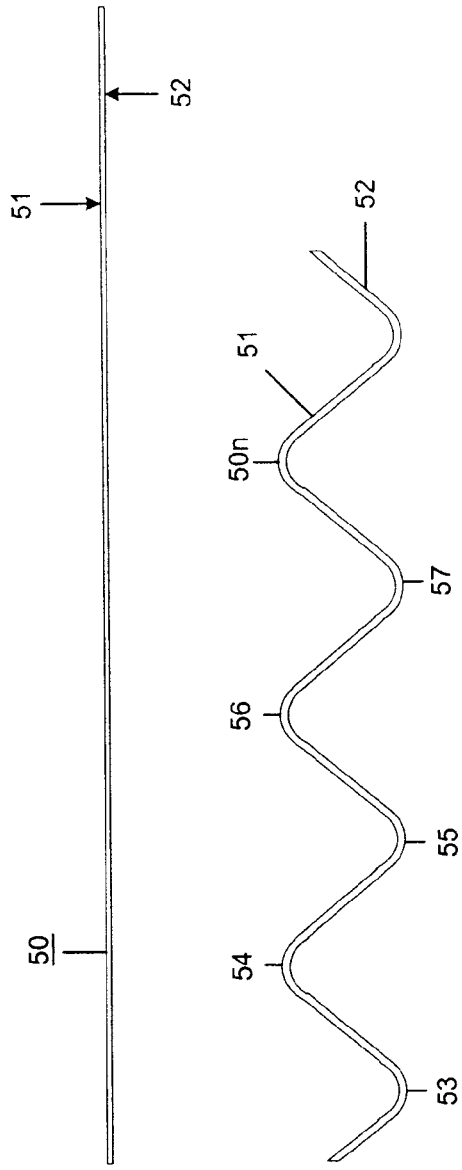
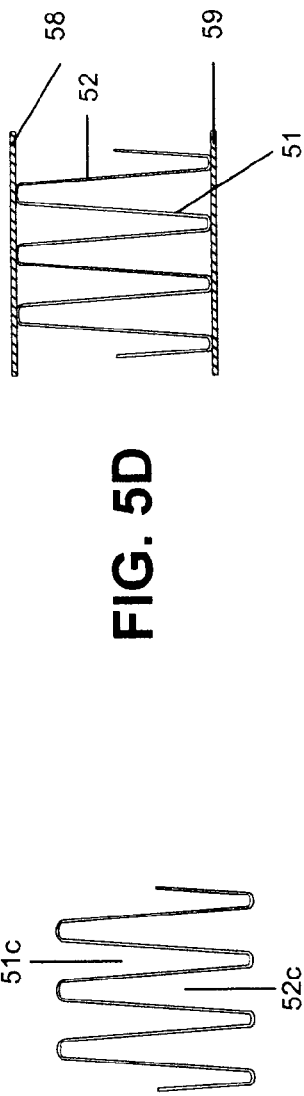
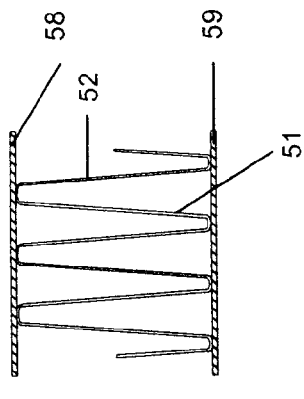
FIG. 5
FIG. 5A
FIG. 5B
FIG. 5C
FIG. 5D

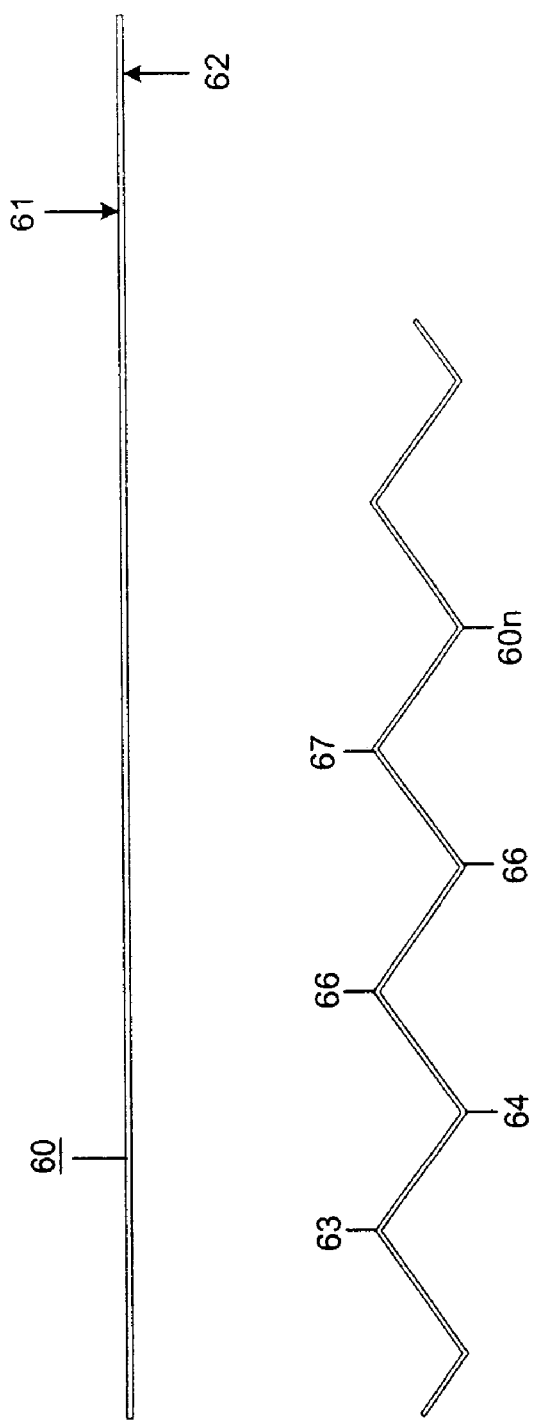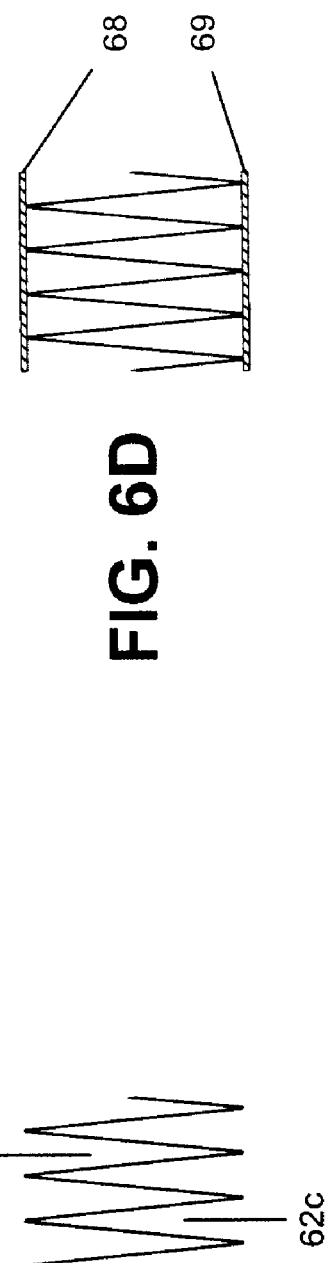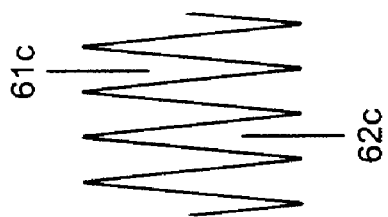

METHOD FOR PRODUCING SUBSTRATE HAVING CATALYST COMPOSITIONS ON SURFACES OF OPPOSITE SIDES

RELATED APPLICATIONS

This application is a division of our application for U.S. Letters patent Ser. No. 09/957,209 filed on Sep. 20, 2001, now U.S. Pat. No. 7,326,669, which in turn was related to U.S. application for Letters patent Ser. No. 09/912,223 filed on Jul. 24, 2001, "Substrates With Small Particle Size Metal Oxide and Noble Metal Catalyst Coatings and Thermal Spraying Methods for Producing the Same," now U.S. Pat. No. 7,005,404, issued on Feb. 28, 2006 and application for Letters patent Ser. No. 09/742,697 filed on Dec. 20, 2000, "Method for Enhancing the Surface of a Substrate and Catalyst Products Produced Thereby," now U.S. Pat. No. 6,491,985, issued on Dec. 10, 2002.

BACKGROUND OF THE INVENTION

The invention relates to a substrate, such as a metallic thin film or plate, having catalyst compositions on the surfaces of each opposite side of the substrate and methods for applying the catalyst compositions to the opposite sides of the substrate. The invention further relates to catalyst surfaced substrates having predetermined shapes formed for use in micro component reactors.

Disclosures of processes for the deposition of ceria particles on a substrate include U.S. Pat. No. 5,063,193 to Bedford et al. which describes a wash coat of high surface area ceria particles and the preparation thereof in which cerium carbonate is converted to ceria via chemical reactions and calcination; U.S. Pat. No. 6,051,528 to Brezny which describes a wash coat created by dissolving cerium carbonate to form cerium acetate which is then treated by spray pyrolysis to form a ceria powder; and U.S. Pat. No. 5,989,648 to Phillips which describes the plasma generation of supported metal catalysts. U.S. Pat. No. 5,453,641 describes V-shaped or tapered micro-channel substrate surfaces and U.S. Pat. No. 5,002,123 also describes V-shaped micro-channels tapered in the direction of flow of fluid through the channel. U.S. Pat. No. 4,777,560 shows a heat sink formed of an integral element of thermally conductive material.

The surfacing of opposite sides of a metallic thin film or plate with a catalyst composition presents numerous difficulties. Disadvantages associated with teachings of the patents referenced above are encountered in the production of micro-channel reactors and heat exchange devices. For example, when a substrate surface is coated with a catalyst by means of thermal gas spraying and the molten coating on the metallic film is cooled by means of vacuum contact with a V-shaped heat sink, providing a coating on the opposite side of a substrate already having one coated surface is not possible with the prior art because of the need for contact with a heat sink. To coat an opposite side of an already coated substrate by thermal spraying is problematic because re-heating occurring during the coating of side two would cause the surface of coated side one of the substrate to melt and puddle, degrading the surface and decreasing the efficiency of the catalyst coating.

The present invention provides a bi-laterally surfaced (or coated) substrate. A first predetermined surface, such as a catalyst, is first applied to a side of the substrate by a thermal spray; a second predetermined surface, such as the same or a different catalyst, is then applied to the opposite side of the substrate by a physical vapor deposition process, such as electron beam evaporation or a sputtering process. Neither surface is substantially degraded during the bi-lateral surface coating process. After both sides of the substrate are surfaced, the substrate may be physically manipulated or formed into a desired shape without affecting the surface properties of the opposite sides. The invention is particularly useful in the deposition of catalyst materials on surfaces of components used in micro-component reaction chamber assemblies.

SUMMARY OF THE INVENTION

In the present invention, a catalyst composition is applied to a first substrate surface by thermal spraying and a catalyst composition is applied to the opposite substrate surface by physical vapor deposition to provide a substrate having high surface area on both sides, coated with minute particles that efficiently promote a predetermined reaction, such as steam reforming or catalytic heating, on either side of the substrate. The preferred use of the substrate is to be formed into a wavy plate separator that defines linear flow micro channels in micro component reactor or heat exchange assemblies, such as are described in co-pending application for U.S. Letters patent Ser. No. 09/627,267 filed on Jul. 28, 2000 assigned to the same assignee as is this application and now U.S. Pat. No. 6,946,113, Seaba et al., inventors, issued on Sep. 20, 2005. Surfaces or coatings, such as alumina, ceria and palladium, are applied to opposite sides of the substrate, which may be planar, or pre-formed into a pre-fold shape by thermal spray and vapor deposition to provide catalytic environments for reactions, such as steam reforming, water-gas-shift and oxidation, in micro component reactors.

A catalyst surface or coating is applied to a first side of the substrate, preferably by a thermal spray process. A plasma can spray materials having very high melting points. Further, the plasma sprayed surfaces achieved in the invention are generally dense, strong and clean. The thermal spray is a continuous, line of sight, directed, melt-spray process in which relatively large catalyst precursor particles (usually 15-200 μm in diameter) are melted and accelerated to high velocities in an environment of one or more than one of a combustion flame, direct current (dc), radio frequency (rf) or dc/rf hybrid non-transferred thermal plasma arc. Molten or semi-molten droplets impinge on the substrate and solidify to form a high surface area coating/surface of minute particles having catalyst properties. The surface is typically an aggregation of minute particulates in a nominal size range distribution where approximately 90% of the surface particles have diameters of less than approximately five microns (5 μm) and preferably less than approximately one micron (1 μm), deposited as a layer on the substrate, generally greater than approximately ten microns (10 μm) thick. The quantity of material deposited on the substrate surface is dependent on the degree/activity of the catalytic properties required for a predetermined application. Typically, the thickness of the catalytic surface will be in the range of from approximately thirty microns (30 μm) to approximately eighty microns (80 μm) for a micro component micro channel reactor For other uses, the layer may be thicker, for example, up to one millimeter (1 mm) thick, with the total amount of catalytic material applied to the surface dependent upon interrelated parameters such as surface area, the specific reactant properties and activity required on a surface and fluid flow rates associated with a particular design.

The referenced related applications describe the deposition of metal hydroxides, carbonates and nitrates and other catalyst precursors on a substrate by thermal spray processes on the first side of a substrate. During a line of sight spray process, the precursor materials decompose and oxides, metals and/or mixtures thereof are formed that adhere in a mechanically stable manner to the surface of a thin metal substrate. For example, with hydroxide, carbonate and nitrate metal compositions, the reactions respectively occur in a thermal spray process: a) $Me(OH)_x \rightarrow MeO_x + H_2O$; b) $Me(CO_3)_x \rightarrow MeO_x + CO_2$; and c) $Me(NO_3)_x \rightarrow MeO_x + N_2$. Noble metal compositions are also deposited on the surface from the thermal spray of precursor compositions. In treating the first surface of the substrate, a copper heat sink vacuum system may support and cool the substrate during deposition.

The problem resolved by the present invention is coating the second side, after the first side is coated, while preserving the integrity of the first side surface. The use of physical vapor deposition on one side in a process using a thermal spray of the other side results in a bi-laterally coated member leaving the first surface intact after the second surface is treated, in which the surfaces on both sides are chemically and/or mechanically bonded to the substrate. The substrate may then be formed into micro channel shapes and the formed member brazed to plates for use in micro component reactors.

The invention is described more fully in the drawings and the following description of the preferred embodiment.

BRIEF DESCRIPTION OF THE DRAWINGS

FIG. 1A is a representation (not to scale) of a shaped and coated thin plate substrate formed into a wavy plate separator for a micro channel separator for a micro component reactor. The opposite sides of the shaped plate are surfaced with different catalysts.

FIG. 1B is a representation (not to scale) of a section of a micro component reactor assembly having upper and lower plates enclosing a thin wavy plate separator forming micro channels on the opposite surface sides thereof. The separator is surfaced on its opposite sides with different catalysts. (The perimeter sides of the enclosure are not shown for reasons of clarity in the figure.)

FIG. 2A and FIG. 2B are representations of alternative thermal spray deposition process for depositing a two (2) component catalyst on a substrate to provide a surfaced substrate such as shown in FIG. 1C, showing respectively, a flat and a pre-formed substrate maintained on a heat sink during the initial deposition process.

FIG. 5 shows in perspective a substrate or shim prior to treatment and shaping in accordance with the invention.

FIG. 5A, FIG. 5B, FIGS. 5C and 5D represent cross sections of the sequential shapes encountered in forming a catalyst coated wavy plate separator for a micro channel micro component reactor beginning with a flat plate and using a curvilinear pre-folded shape that is formed into the wavy plate separator in a micro component reactor.

FIG. 6A, FIG. 6B, FIGS. 6C and 6D represent sequential shapes encountered in forming a catalyst coated wavy plate separator for a micro channel micro component reactor using an angularly pre-folded shape.

DETAILED DESCRIPTION OF THE INVENTION AND THE PREFERRED EMBODIMENT

Figure 1C:
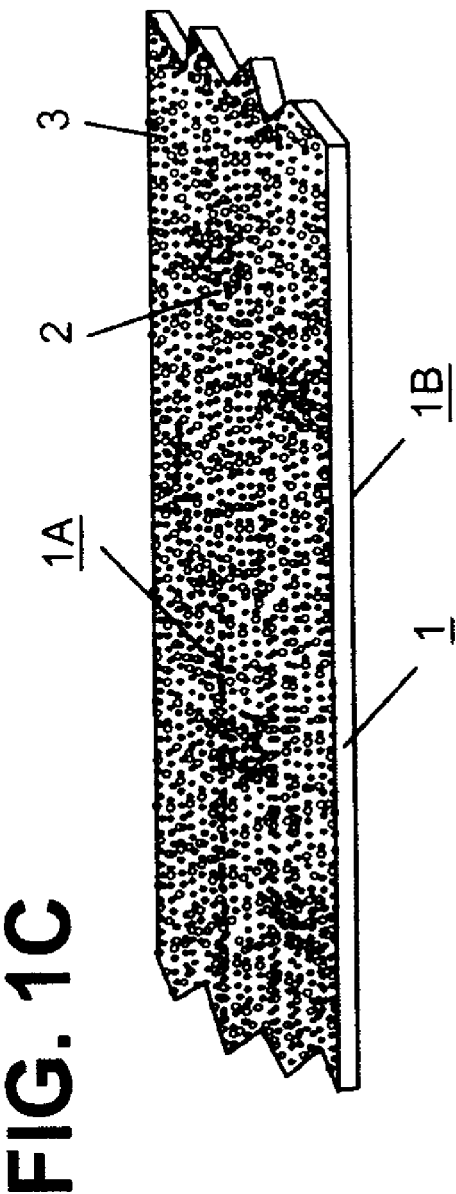
FIG. 1C is a representation (not to scale) of a section of a coated thin plate with a multiple component catalyst surface on a first side.

The present invention provides a bilaterally treated substrate useful, inter alia, as an improved separator or wavy plate for a micro channel reactor and a method for treating or providing surfaces on the two opposite sides of a thin film or wavy plate substrate. A substrate is coated on first and second surfaces. The first surface consists of one or more than one of cerium oxide, aluminum oxide, tin oxide manganese oxide, copper oxide, cobalt oxide, nickel oxide, praseodymium oxide, terbium oxide, ruthenium, rhodium, palladium, silver, iridium, platinum and gold. The second surface consists of one or more than one of ruthenium, rhodium, palladium, silver, iridium, platinum and gold. The first surface comprises particles having a nominal diameter size distribution in which approximately 90% of the particles have a diameter in the approximate range of <5 microns and preferably <1 micron; the second surface comprises a coating having a nominal thickness of <100 nanometers. The base substrate is a thin metallic film, preferably a nickel-based alloy which may be treated flat or with pre-folds having apexes spaced apart a predetermined distance corresponding to the apexes in a folded member that forms channels of a predetermined side separation and depth, such as a separator wavy plate in a micro channel reactor. The folds may be curvilinear or angular. In an example, the first surface consists of a ceria and palladium catalyst and the second/opposite surface consists of a palladium catalyst. Characteristics of the first surface applied to the substrate will typically include a thickness in the nominal range of greater than approximately thirty microns (30 μm) and a porosity of at least 50%. In another example, the second surface has an adhesion quality to the substrate that tolerates a recycling temperature in the range of 1000° C.

In the method of the invention, opposite surfaces of a substrate are coated with catalysts in a method in which a first surface of the substrate is thermally sprayed with particulates of one or more than one of a metal hydroxide, metal carbonate, or metal nitrate particles and a noble metal, noble metal hydroxide, noble metal carbonate, or noble metal nitrate to produce a first catalyst composition thereon, and the opposite surface of the substrate is coated by electron beam deposition with one or more than one of ruthenium, rhodium, palladium, silver, iridium, platinum and gold to produce a second catalyst composition thereon. The second surface may be cleaned by an ion-gun in an oxygen atmosphere and in an argon atmosphere prior to deposition. The substrate may be supported upon a substantially rigid heat sink in which the opposite surface of the substrate is in contact with a heat sink during the thermal spraying of the first surface.

When used in the making of a micro channel catalytic device, the substrate is pre-formed with longitudinal folds spaced a predetermined distance apart corresponding to predetermined apexes of micro channels having a predetermined depth. Stamping an initially flat shim, sheet or plate material to produce curvilinear folds such as shown in FIG. 5B is a preferred pre-form method. The first surface of the substrate is thermal sprayed with particulates of one or more than one of a metal hydroxide, metal carbonate, or metal nitrate particles and a noble metal, noble metal hydroxide, noble metal carbonate, or noble metal nitrate to produce a first catalyst composition thereon. The opposite surface of the substrate is coated by electron beam deposition with one or more than one of ruthenium, rhodium, palladium, and silver, iridium, platinum and gold to produce a second catalyst composition thereon. The so surfaced substrate is then squeezed laterally such that the preformed folds of the substrate narrow in the separation distance between adjacent, facing side sections, from their apexes to form micro channels with a high depth to width aspect ratio. In one aspect, the preformed substrate is supported in contact with a substantially rigid heat sink having an upper surface with a shape corresponding to an underside of the pre-folded substrate during the step of thermal spraying. The opposite side dis then surfaced with a catalyst composition. After being so treated, the scored or pre-folded substrate is squeezed from opposite lateral sides to narrow the longitudinal separations between the folds to form a wavy plate separator. Apexes on the opposite sides of the folded/squeezed substrate are brazed to upper and lower plates to form the enclosed channels of a micro reactor assembly. In the method, the first surface may be grit-blasted prior to thermal spraying and the electron beam deposition on the second surface is preferably performed subsequent to the thermal spraying of the first surface.

The present invention provides a first surface catalytic substrate surface comprising a particulate coating of a) one or more than one of cerium, aluminum, tin, manganese, copper, cobalt, nickel, praseodymium or terbium oxide and b) one or more than one of ruthenium, rhodium, palladium, silver, iridium, platinum and gold, characterized as a substantially uniform distribution over the surface of the substrate in which the coating particles are in the nominal diameter size distribution range of <5 microns, preferably, in the nominal diameter size distribution range of <2 or 3 microns. Most preferably, the coating particles are in the nominal diameter size distribution range of <1 micron, namely, 90% of the particles in the distribution have a diameter less than 1 micron. Smaller particle sizes at the surface optimize the desired catalyst characteristics of the substrate (e.g., enhanced surface area) achieved by the invention. The catalytic surface coating is produced by thermal spraying a mixture of large size particles (e.g., in a nominal size distribution range of >10 micrometers to 200 micrometers or more, limited by the nozzle spray orifice of the thermal spray) of hydroxides, carbonates or nitrates of the metals, cerium, aluminum, tin, manganese, copper, cobalt, nickel, praseodymium or terbium and the hydroxides, carbonates or nitrates of the noble metals, ruthenium, rhodium, palladium, silver, iridium, platinum and gold onto the substrate.

The first surface is sprayed with metal oxide precursors, preferably cerium carbonate or cerium hydroxide, which become a ceria coating on a metal surface; and a noble metal catalyst, which is deposited on the surface in the same operation. Large particle cerium carbonate is oxidized to cerium oxide, $Ce_2(CO_3)_x \cdot XH_2O \rightarrow Ce_2O_3 + 3CO_2 + XH_2O$. In the presence of air or oxygen, $Ce_2O_3$ is oxidized to $CeO_2$, namely, $Ce_2O_3 + \frac{1}{2}O_2 = 2CeO_2$. After the thermal spraying, if a substantial quantity of $Ce_2O_3$ is present on the substrate surface, an after-treatment may be applied to achieve the correct phase of $CeO_2$. In the process, the large size particles decompose, the water component vaporizes and a ceria/noble metal mixture coating on the substrate surface results.

In an embodiment, a mixture of noble metal component particles are injected into a thermal spray to produce a catalyst coating of metal oxide/noble metal having a nominal particle size diameter distribution in the range of <5 microns, particularly <2 or 3 microns, and more preferably <1 micron (In the ranges stated herein, a particular distribution includes approximately 90% of the particles within the parameter stated.) on a first surface of a substrate, preferably, a thin metallic film. In an embodiment, the metal oxide/noble metal particulate surface mixture is ceria/palladium. After cooling, the second surface of the substrate is coated, preferably by physical vapor deposition, such as electron-beam evaporation or plasma sputtering, with a noble metal, such as palladium. In an embodiment, the second surface is deposited after the cooling of the first surface. A physical vapor deposition method for the second surface allows the first surface coating to remain intact. The invention provides a two-sided microchannel with a first surface having a porous, fine particle coating of a mixture of metal oxides and noble metals, having good mechanical adhesion to a substrate surface and stability properties and surface characteristics useful for catalytic reactor applications; and a second surface coated with a noble metal oxidation catalyst for converting hydrocarbons to heat energy.

In an example, the substrate is a chromium-nickel super alloy such as Inconel® is roughened by grit blasting prior to thermal spraying. The substrate may be flat, or preformed in a curvilinear or angular folded accordion-like shape, prior to the thermal spray. The first surface of the substrate is coated with a catalyst by plasma-spray. The coating used in an embodiment is a mixture of ceria and palladium. In an alternate embodiment the noble metal is deposited on the same surface by physical vapor deposition after the deposition of ceria. The substrate is positioned on a copper block by means of a low vacuum. In an embodiment such as shown in FIG. 2B, the support/cooling block corresponds to the pre-formed shape of the substrate. The block cools the substrate during spraying by means of a coolant system such as by water flow through channels in the support block.

After the thermal spraying, the second (or opposite) side of the substrate is coated with a noble metal, such as ruthenium, rhodium, palladium, silver, iridium, platinum or gold. In an embodiment, palladium is deposited by electron beam evaporation. The second surface is cleaned with an ion-gun using 5 minutes of oxygen and 10 minutes of argon. In one example, the evaporation of palladium by e-beam is at a rate of 1 Å per second and the coatings of palladium may be applied in a thickness of from approximately five nanometers (5 nm) to approximately ninety nanometers (90 nm). The surfaces are sufficiently adhesive to withstand a temperature up to approximately 1000° C. To be optimized for a particular application, the criterion of material cost of a noble metal is balanced with the degree of catalytic activity desired in a particular process environment. With a noble metal, a surface thickness of one hundred nanometers (100 nm) appears to be the economically practical upper limit for a substrate so processed employed as a separator in a micro channel micro component reactor such as described in the above referenced application for U.S. Letters patent Ser. No. 09/627,267 filed on Jul. 28, 2000, now U.S. Pat. No. 6,946,113.

Figure 1D:
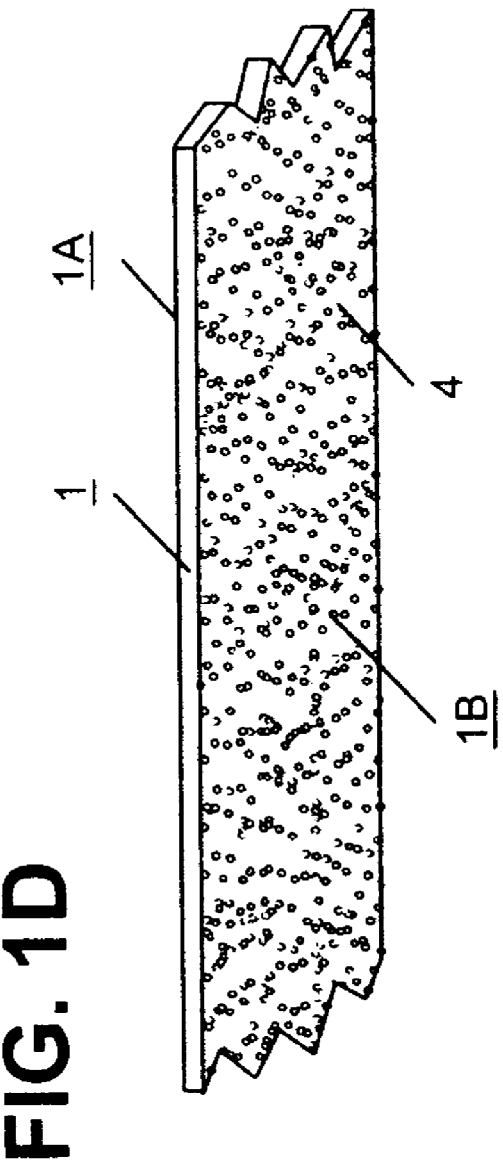
FIG. 1D is a representation (not to scale) of a section of a coated thin plate with a single component catalyst surface on a second or opposite side.

With reference to the drawings, a shaped and coated thin plate substrate 1 having opposite sides 1A and 1B is shown in FIG. 1A, formed as a wavy plate separator for forming micro channels in a micro component reactor. Apexes of the folds are shown at A1, A2, A3 and A4. The opposite sides of the shaped plate are surfaced with different catalysts, side 1A, for example, surfaced with a mixture of ceria 2 and palladium 3, and side 1B surfaced with palladium 4. In the reactor, fluid flows FA and FB are introduced on opposite sides 1A and 1B of the separator. FIG. 1B illustrates the wavy plate with apexes A1, A2, A3 and A4 of the folded substrate 1 brazed to upper 5 and lower 6 plates that enclose the opposite sides of the substrate/wavy plate, forming enclosed longitudinally extending micro channels, such as C1, C2, C3, C4, Cn for fluid flows FA and FB. The fluid flows are introduced into or exit from the reactor assembly through lateral orifices 5A and 6A transverse to the micro channels at the front and rear (not shown) of the upper and lower plates enclosing the reactor. FIG. 1C and FIG. 1D illustrate sections of the separator with different particulate coatings (or surfaces) applied to the opposite sides of the substrate. The reference numerals in FIG. 1C and FIG. 1D identify comparable elements identified with the same numerals in FIG. 1A.

Figure 2A:
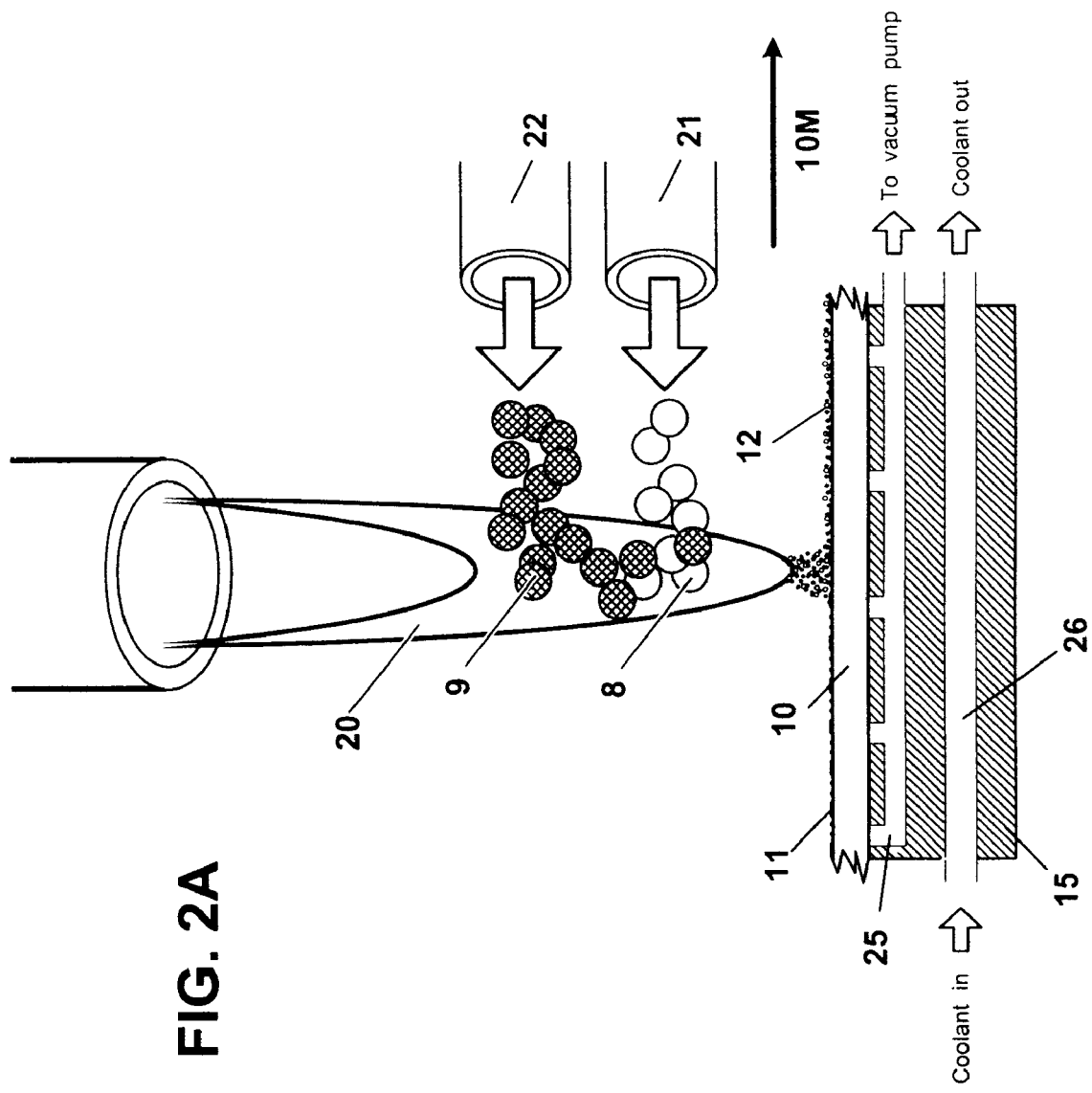

FIG. 2A and FIG. 2B are representations of the thermal spray processes (not to scale) in which large size particle precursor materials 8 and 9 are introduced through orifices 21 and 22 into a plasma 20 directed onto the first side surface 11 of a substrate 10 maintained by vacuum 25 on a supporting and complementarily shaped heat sink 15 having a coolant system 26. The plasma spray of the precursor particles 8 and 9, as the substrate is manipulated 10M so that its surface area is exposed to the spray, results in the deposit on the first side surface 11 of a mixture of small size catalyst particles 12. Above referenced application for U.S. Letters patent Ser. No. 09/912,223 filed on Jul. 24, 2001, now U.S. Pat. No. 7,005,404, and application for Letters patent Ser. No. 09/742,697 filed on Dec. 20, 2000, now U.S. Pat. No. 6,491,985, describe various methods and variations of the thermal spray process employed to provide a mixture of catalyst particles on a substrate surface.

Figure 3:
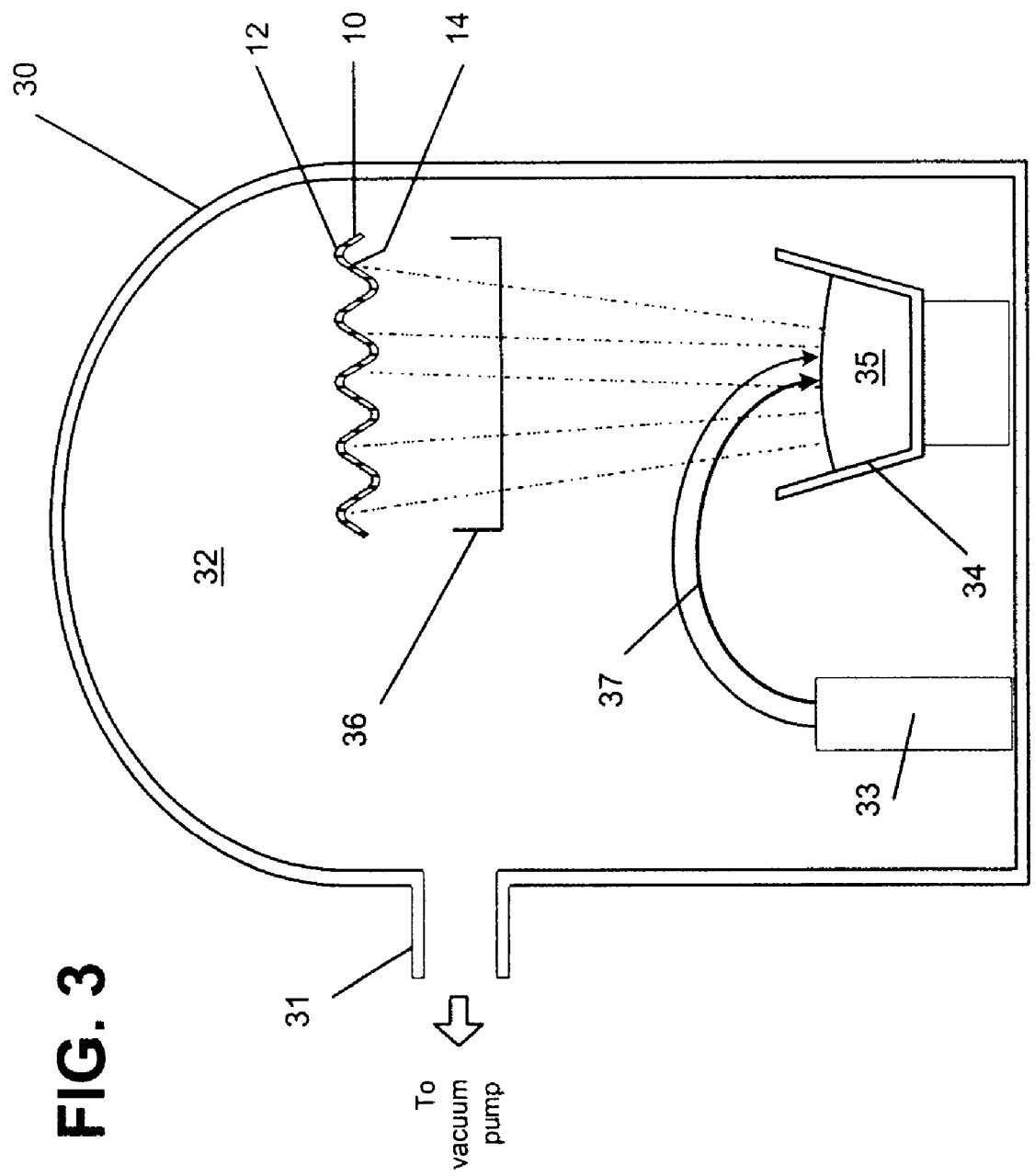
FIG. 3 is a representation of the deposition by electron beam evaporation of a single component coating on a second surface of a substrate to provide a surfaced substrate such as shown in FIG. 1D.

After the first surface of the substrate is coated, the opposite side surface is coated by a physical deposition method. In FIG. 3, an enclosure 30 interconnected 31 with a vacuum pump provides a vacuum chamber 32 for maintaining the substrate 10, having a first side surface 11 already applied thereon, therein. The substrate 10 is shown in a pre-folded configuration. The chamber also contains electrode 33 and container 34 for holding therein a noble metal material 35 which is vaporized, when a suitable electron beam field is generated between electrode 33 and noble metal 35. The noble metal vapor 36 is directed to the underside 14 of the substrate 10 already having a catalyst 12 deposited thereon.

Figure 4:
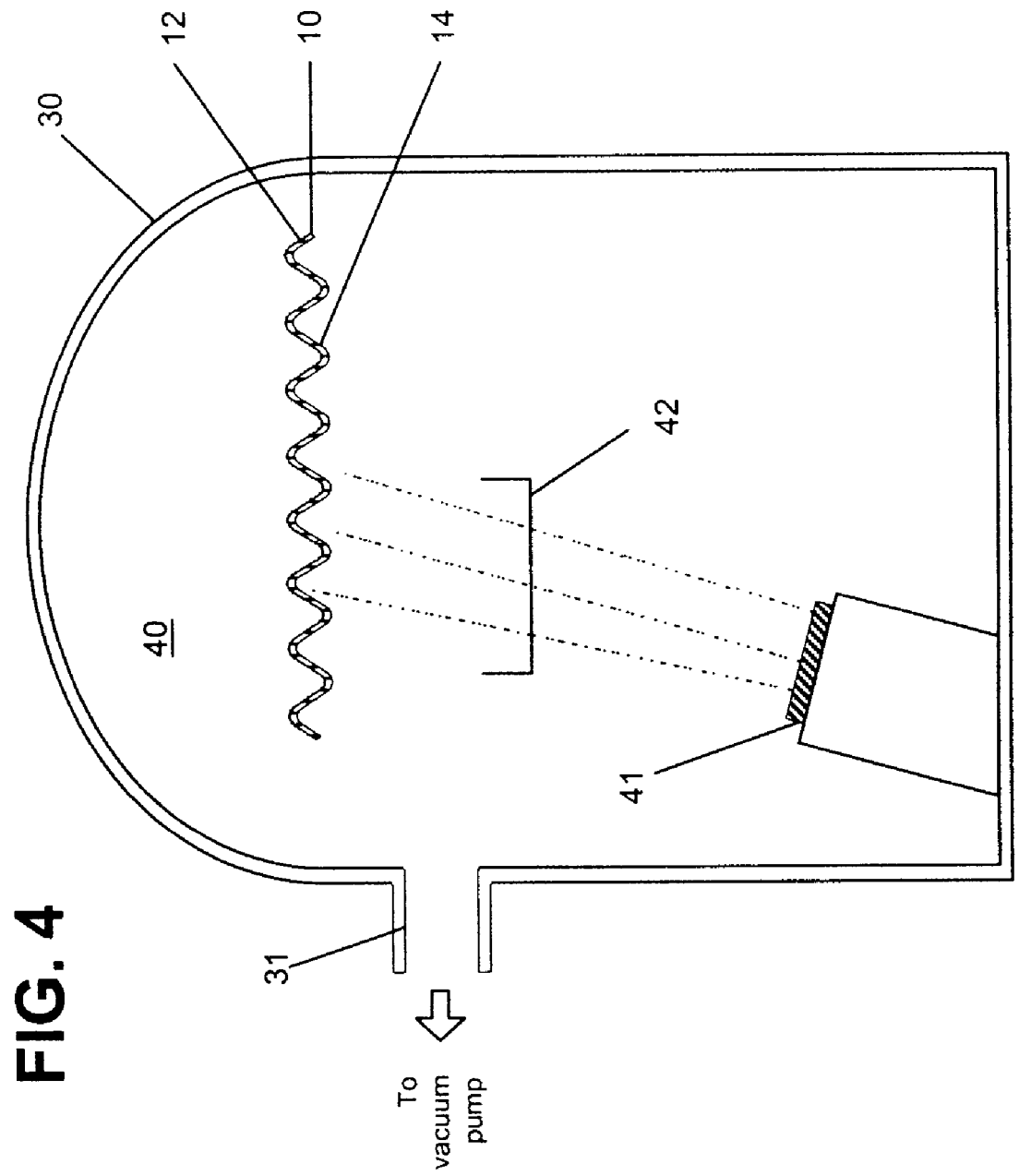
FIG. 4 is a representation of the deposition by plasma sputtering of a single component coating on a second surface of a substrate to provide a surfaced substrate such as shown in FIG. 1D.

FIG. 4 illustrates an alternate surfacing method in a vacuum chamber 40 configured similarly to the chamber 32 described above. In the chamber, the substrate 10 is supported such that noble metal vapor 42 created by plasma sputtering from source 41 is deposited on the under/opposite side 14 of substrate 10.

FIG. 5 illustrates a beginning shim, foil or flat plate substrate 50 having opposite first 51 and second 52 surfaces to be treated in accordance with the invention. In an example for use in a typically micro channel micro component reactor assembly, the substrate will be an Inconel® metal alloy material approximately one hundred microns (100 μm) thick, approximately 355 millimeters in length and 60 millimeters in width. FIG. 5A illustrates a cross section of the beginning substrate. The first surface 51 of the substrate may be treated flat or pre-formed. FIG. 5B shows a substrate pre-formed in a curvilinear wave shape by a stamping process with preliminary folds at apexes 53, 54, 55, 56, 57, 50n, etc., forming approximately 45° to 75°, with 60° preferred, angles between the adjacent folded sections. Each side 51 and 52 of the pre-folded substrate is coated with catalyst material, respectively by thermal spray and physical deposition as described above. The pre-folded substrate is then laterally squeezed to narrow the separations between adjacent folds as determined by the apexes to form micro channel precursors 51c and 52c as shown in FIG. 5C. As shown in FIG. 5D, the squeezed substrate (having a greater width to depth aspect ratio) is then brazed at the apexes to upper plate 58 and lower plate 59 in an enclosure (not shown in the drawing) adapted to form adjacent and separated micro channels for fluid flow in a micro component reactor. See Application for Letters Patent of the U.S. Ser. No. 09/627,267 filed on Jul. 28, 2000, supra, now U.S. Pat. No. 6,946,113.

FIG. 6A, FIG. 6B, FIG. 6C and FIG. 6D represent sequential shapes encountered in forming a catalyst coated wavy plate separator for a micro channel micro component reactor using an angularly shaped pre-folded substrate in an alternative to the curvilinear shape shown in FIG. 5B, FIG. 5C and FIG. 5D. In FIG. 6A, an angular shaped wavy plate precursor is formed having apexes 63, 64, 65, 66, 67, 60n, etc., treated to deposit the desired catalyst surfaces on each opposite side, then squeezed as shown in FIG. 6C to narrow the distances between adjacent folds, and brazed to upper plate 68 and lower plate 69 in the micro component micro channel reactor enclosure to form reactive fluid flow channels. In pre-forming or squeezing the folds, the brittle ceria/metal surface on the substrate does not detach or otherwise deteriorate and the adhesion of both the ceria/metal and noble metal catalysts to the substrate is not adversely affected by the forming or squeezing process In the invention, a thermally sprayed coating on a first side of a substrate yields a thin layer of a catalyst coating with small particle size and high surface area. In an embodiment, the method is applied to form a catalyst coating on a channel separator element used in a micro-component heat exchanger/reactor unit used in laminar flow reactors for hydrogen production devices employed in conjunction with low power fuel cells in automotive or mobile or other equivalent applications. See U.S. application for Letters patent Ser. No. 09/627,267 filed on Jul. 28, 2000, entitled "Multi-purpose Micro-channel Micro-component," now U.S. Pat. No. 6,946,113 assigned to the assignee of the present application, the disclosure of which is hereby incorporated by reference.

The overall process of forming such a micro component includes steps from substrate preparation to substrate surface modification to the application of a coating on the first surface by thermal spraying to produce a metal oxide and noble metal catalyst on the substrate. A flat substrate as shown in FIG. 5A or FIG. 6A or a pre-formed substrate, such as the corrugated shim precursor to a wavy plate shown in FIG. 5B and FIG. 6B is subjected to surface grit blasting or like treatment (before or after the formation of partial folds) The substrate is positioned to receive the thermal spray as shown in FIG. 2A or FIG. 2B, preferably mounted on a heat sink to maintain a low temperature in the substrate material. Catalyst precursors are injected into a thermal spray and oxide/metal oxide/metal catalyst is deposited on the substrate surface by the spray.

The thermal sprayed coating bonds directly with the surface of the substrate. Desirable characteristics, including high porosity, high surface profile and surface area and small particle size, are beneficially achieved in the thermally sprayed coating. A catalyst precursor material, preferably a mixture of multiple materials, in the form of a particulate, powder or granule having a large particle size, for example, in a scale greater than about approximately ten micrometers (10 micro) and up to about several hundred or more micrometers (approximately 200 micro) is thermally sprayed onto the substrate and forms a catalyst coating that bonds to the substrate surface. The coating is formed from decomposition products of the sprayed mixture material and is characterized as a distribution of small size particles, namely in the order of less than approximately five microns (5 μm) in nominal diameter, preferably in the order of less than approximately two microns (2 μm) or three microns (3 μm) in nominal diameter, and more preferably in the order of less than approximately one micron (1 μm) in nominal diameter. Although the substrate may be coated sequentially in multiple layers beginning with a ceria foundation, followed by a further coating of a catalytic material, such as a noble metal, a mixture of both compositions is preferred to be thermally sprayed in the same operation.

The catalyst formed in the thermal spray process and subsequent treatment, if any, promotes a chemical reaction when a reagent fluid flows through the channels of the micro-component device. One or both surfaces of the wavy plate separator may be treated. In this aspect of the invention, the coatings, and the enhanced surface properties thereof, also assist in the transfer of heat between adjacent channels in the micro-component device. In the invention, large size particles, or a mixture of large size particles comprising a catalyst precursor, are flame sprayed or plasma sprayed onto a substrate to produce a small particle size coating by a pyrolysis process in which heat decomposes the sprayed material. Before thermal spraying, the substrate surface may be enhanced by methods such as grit blasting and/or chemical treatment to improve adhesion of the thermally sprayed coating to the substrate.

After the deposition of the first surface coating, the process continues with the deposition of a second surface coating. The second surface in an embodiment is opposite of the first surface. Physical vapor deposition such as by electron-bean evaporation shown in FIG. 3 or plasma sputtering shown in FIG. 4 is used as a coating method for the second surface to deposit a noble metal, preferably, palladium. Alternatively, the vapor deposition may be accomplished first followed by the thermal spraying the heat sink used in the thermal spray process maintains a relatively low temperature of the substrate such that the metal coating is not likely to be affected. As a result of this process, squeezing the substrate to form the micro channel precursors produces no brittle areas or flaking of the coatings.

In a typical micro channel micro component for a steam reformer or water-gas-shift reactor, the first side of the substrate forms one set of channels having a surface catalyst for converting fuels to hydrocarbons and the second side of the substrate forms the opposite set of channels having a catalyst surface for oxidizing hydrocarbons to heat energy.

Having described the invention in detail, those skilled in the art will appreciate that, given the present disclosure, modifications may be made to the invention without departing from the spirit of the inventive concept herein described. Rather, it is intended that the scope of the invention be determined by the appended claims.

We claim:

1. A method of providing different catalyst surfaces on the opposite surface sides of a metal substrate comprising: thermal spraying one surface of the substrate with a mixture of powders having a size greater than 10 micrometers and no more than 200 micrometers comprising 1) one or more than one of a hydroxide, carbonate, or nitrate of one or more than one of cerium, aluminum, tin, manganese, copper, cobalt, nickel, praseodymium or terbium and 2) one or more than one of a noble metal, noble metal hydroxide, noble metal carbonate, or noble metal nitrate onto the surface of the substrate such that the particles in the mixture decompose by pyrolysis to produce a mixture of, respectively on the one surface a distribution of particles of an oxide of one or more than one of cerium, aluminum, tin, manganese, copper, cobalt, nickel, praseodymium or terbium and particles of one or more than one of ruthenium, rhodium, palladium, silver, iridium, platinum and gold, such that the sprayed mixture results in particles bonded to the surface where approximately 90% have a size less than 5 microns (μm); and, subsequent to the thermal spraying, coating the surface of the substrate opposite the one surface by a physical vapor deposition process with one or more than one of ruthenium, rhodium, palladium, silver, iridium, platinum and gold.

2. The method of claim 1 in which the surface to be coated by a physical vapor deposition process opposite the first surface is cleaned by an ion-gun first in an oxygen atmosphere and then in an argon atmosphere.

3. The method of claim 1 wherein the substrate is supported upon a rigid heat sink conforming to the shape of the substrate during the thermal spraying of the one surface.

4. The method of claim 1 in which coating the opposite surface of the substrate with one or more than one of ruthenium, rhodium, palladium, silver, iridium, platinum and gold by a physical vapor deposition process comprises plasma sputtering of the one or more than one of ruthenium, rhodium, palladium, silver, iridium, platinum and gold.

5. The method of claim 1 wherein approximately 90% the particles in the mixture bonded to the one side have a size less than one micron.

6. A method of making a micro channel catalytic device comprising: pre-forming a metal substrate with longitudinal folds spaced a predetermined distance apart corresponding to predetermined apexes of micro channels having a predetermined width and depth; thermal spraying a surface of the pre-formed substrate with a powder mixture of 1) metal oxide precursors comprising particulates of one or more than one of a hydroxide, carbonate, or nitrate of one or more than one of cerium, aluminum, tin, manganese, copper, cobalt, nickel, praseodymium or terbium and 2) one or more than one of a metal, metal hydroxide, metal carbonate, or metal nitrate of one or more than one of ruthenium, rhodium, palladium, silver, iridium, platinum and gold, the mixture of powders having a size greater than 10 micrometers and no more than 200 micrometers, to produce on the surface, respectively, an oxide composition of a mixture of 1) one or more than one of cerium, aluminum, tin, manganese, copper, cobalt, nickel, praseodymium or terbium and 2) one or more than one of ruthenium, rhodium, palladium, silver, iridium, platinum or gold, whereby in the thermal spraying, the powder mixture decomposes and the composition sprayed on the surface is bonded to the surface and where approximately 90% of the particles of the composition so bonded have a size less than 5 microns (μm); and, subsequent to the thermal spraying, coating the surface of the substrate opposite the first surface by a physical vapor deposition process with one or more than one of ruthenium, rhodium, palladium, silver, iridium, platinum and gold.

7. The method of claim 6 for making a micro channel catalytic device wherein the step of pre-forming comprises longitudinally squeezing the substrate laterally such that the preformed folds of the substrate compress from their apexes to form micro channels.

8. The method of claim 6 wherein pre-forming the substrate with longitudinal folds comprises stamping the folds into a sheet material.

9. The method of claim 6 in which the preformed substrate is supported during the step of thermal spraying in contact with a rigid heat sink having an upper surface with a shape corresponding to the supported side of the pre-folded substrate.

10. The method of claim 6 further including, after the steps of thermal spraying and physical vapor deposition, brazing the apexes of the folds on each side of the substrate to a plate to form enclosed channels defined by the apexes of the folds.

11. A method of making a micro channel catalytic device in accordance with claim 6 including the further steps of 1) squeezing, after the deposition of a catalytic material thereon, the preformed metal shape from opposite lateral sides to compress the longitudinal separations between the folds to form a wavy plate separator; 2) enclosing the wavy plate between a set of upper and lower plates to form enclosed channels of a micro reactor assembly that are defined by the apexes on the opposite sides of the squeezed preformed shape; and 3) brazing the apexes of the squeezed shape to the upper and lower plates.

12. The method of claim 6 wherein approximately 90% the particles in the mixture bonded to the one side have a size less than one micron.

* * * * *